United States Patent
Swan

(10) Patent No.: US 12,517,497 B2
(45) Date of Patent: Jan. 6, 2026

(54) SOLAR BOARD SYSTEM

(71) Applicant: Robert A. Swan, Whitehouse Station, NJ (US)

(72) Inventor: Robert A. Swan, Whitehouse Station, NJ (US)

(*) Notice: Subject to any disclaimer, the term of this patent is extended or adjusted under 35 U.S.C. 154(b) by 505 days.

(21) Appl. No.: 17/991,295

(22) Filed: Nov. 21, 2022

(65) Prior Publication Data

US 2023/0185284 A1    Jun. 15, 2023

Related U.S. Application Data

(60) Provisional application No. 63/287,781, filed on Dec. 9, 2021.

(51) Int. Cl.
*G05B 19/416* (2006.01)
*G06N 20/00* (2019.01)

(52) U.S. Cl.
CPC ........... *G05B 19/416* (2013.01); *G06N 20/00* (2019.01); *G05B 2219/37283* (2013.01); *G05B 2219/37371* (2013.01)

(58) Field of Classification Search
CPC ........ G05B 19/416; G05B 2219/37283; G05B 2219/37371; G06N 20/00
USPC ........................................................ 700/282
See application file for complete search history.

(56) References Cited

U.S. PATENT DOCUMENTS

| | | | | |
|---|---|---|---|---|
| 11,714,432 B2* | 8/2023 | Lyon | ................... | G05D 7/0635 |
| | | | | 700/282 |
| 2014/0076305 A1* | 3/2014 | Jackman | ................. | F24S 60/30 |
| | | | | 126/646 |
| 2014/0183957 A1* | 7/2014 | Duchesneau | ......... | F01K 13/006 |
| | | | | 307/64 |
| 2016/0161310 A1* | 6/2016 | Leaders | .................. | G01F 1/663 |
| | | | | 702/48 |
| 2018/0347406 A1 | 12/2018 | Friesth | | |
| 2020/0217518 A1 | 7/2020 | Field et al. | | |
| 2020/0355529 A1 | 11/2020 | Leaders et al. | | |
| 2021/0222689 A1* | 7/2021 | Kirch | ...................... | F04B 17/03 |
| 2023/0222531 A1* | 7/2023 | Cella | .................. | G06Q 10/0631 |
| | | | | 705/7.31 |

OTHER PUBLICATIONS

International Search Report and Written Opinion for International Application No. PCT/US2022/050785, mailed Mar. 10, 2023, 15 Pages.

* cited by examiner

*Primary Examiner* — Md Azad
(74) *Attorney, Agent, or Firm* — Lowenstein Sandler LLP

(57) ABSTRACT

A method includes, responsive to first input, actuating a first plurality of valves of a solar board to be in an open position to provide cold water via a first manifold mounted to the solar board to first equipment and to receive hot water from the first equipment. The method further includes, responsive to second input, actuating a second plurality of valves of the solar board to be in the open position to provide the cold water via the first manifold and a second manifold mounted to the solar board to second equipment and to receive the hot water from the second equipment.

18 Claims, 8 Drawing Sheets

SOLAR BOARD SYSTEM

RELATED APPLICATION

This application claims the benefit of U.S. Provisional Application No. 63/287,781, filed Dec. 9, 2022, the contents of which are incorporated in their entirety.

TECHNICAL FIELD

Embodiments of the present disclosure relate to systems, and in particular to solar board systems.

BACKGROUND

Equipment use energy to perform functions. Some equipment may use electricity received from the municipal electrical grid or electricity that is locally generated (e.g., via solar panels, wind turbines, etc.). Some equipment may use other forms of energy (e.g., natural gas, oil, propane, etc.).

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1A:
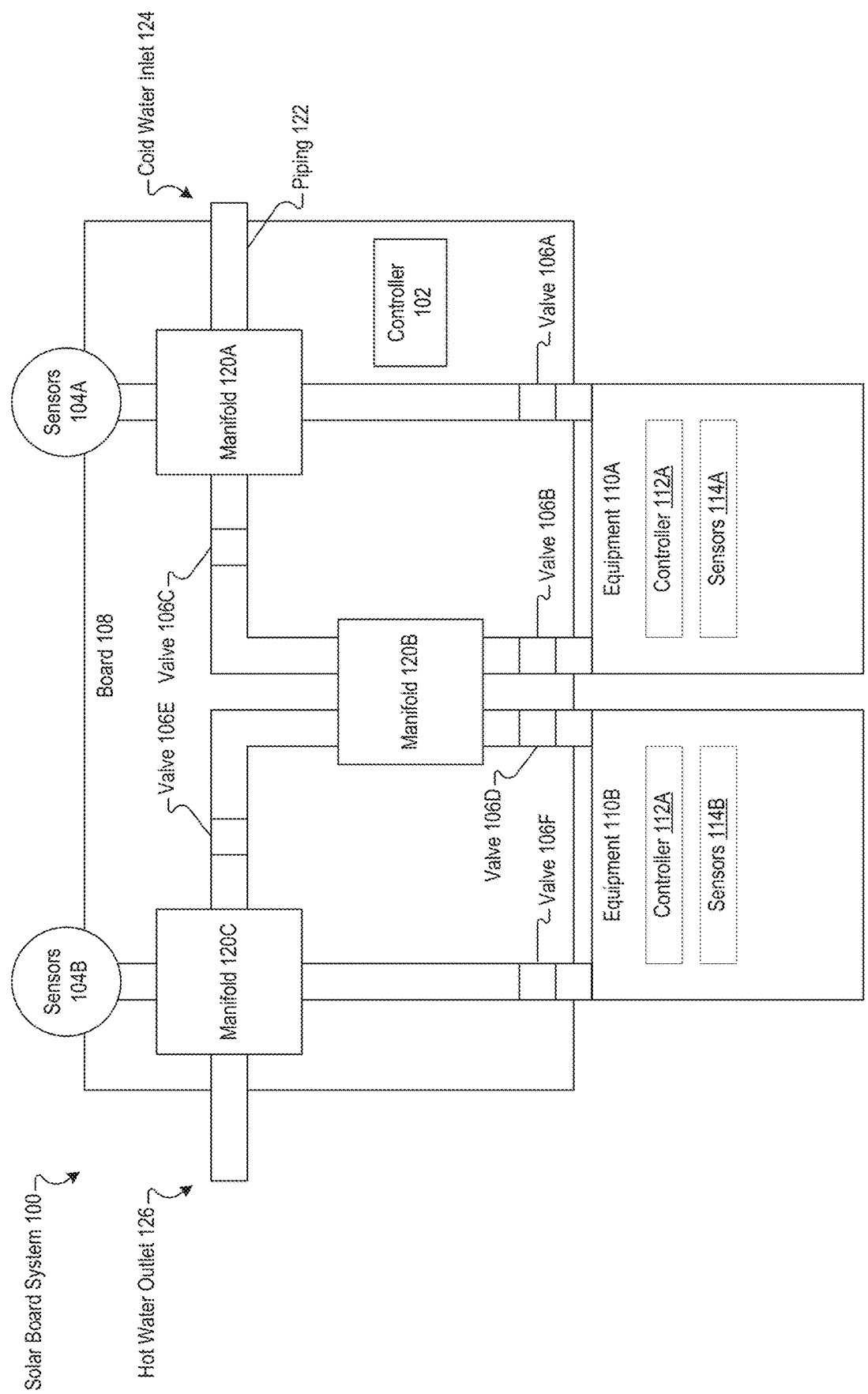
FIGS. 1A-D illustrates solar board systems and equipment, according to certain embodiments.

Embodiments described herein are related to solar board systems.

Different types of equipment use different types of energy. For example, an electric water heater is powered by electricity and a natural gas water heater is powered by natural gas. A type of energy can be provided from different sources. For example, electricity can be provided from the municipal electric grid and from local sources of electricity (e.g., solar panels, wind turbines, etc.). A building can include local sources of electricity (e.g., solar panels) and batteries to store a limited amount of locally generated electricity.

Conventionally, depending on current weather conditions (e.g., amount of sun irradiance on the solar panels, amount of snow covering the solar panels) and building energy usage, a building has a surplus of locally generated electricity at times and has a deficit of locally generated electricity at times. When the building has a deficit of locally generated electricity, extra electricity is to be purchased from the municipal electric grid at a higher price. When the building has a surplus of locally generated electricity, the extra electricity is sold back to the municipal electric grid at a lower price. Due to changing weather conditions and changing building energy usage, conventionally it is difficult to match locally generated electricity with the building energy demands. Some municipal electric grids have surge prices at times of high electricity demand. Conventionally, it is difficult to not have a deficit in locally generated electricity during surge price times of municipal electric grids.

The devices, systems, and methods disclosed herein provide solar board systems. A solar board system may include manifolds mounted to a board (e.g., that is mounted to the wall). The solar board system receives cold water via a cold water inlet and provides hot water via a hot water outlet. The solar board system is fluidly coupled to at least two equipment (e.g., at least two water heaters). In some embodiments, the at least two equipment use different types of energy. For example, the at least two equipment may include an electric water heater and a natural gas water heater.

The solar board system includes valves that are actuatable to use one or more of the at least two equipment. A first manifold may be configured to receive the cold water from the cold water inlet and a third manifold may be configured to provide the hot water to the hot water outlet. A second manifold may be configured to receive hot water from first equipment responsive to a first valve and a second valve being in an open position, the first valve being disposed between the first manifold and a first equipment inlet and the second valve being disposed between a first equipment outlet and the second manifold. The second manifold may be configured to provide the cold water to second equipment responsive to a third valve and a fourth valve being in the open position, the third valve being disposed between the first manifold and the second manifold and the fourth valve being disposed between the second manifold and second equipment inlet. The third manifold may be configured to receive the hot water from the second manifold responsive to the first valve, the second valve, and the fifth valve being in the open position, where the fifth valve is disposed between the second manifold and the third manifold. The third manifold may be configured to receive the hot water from second equipment outlet responsive to the third valve, the fourth valve, and the sixth valve being in the open position, where the sixth valve is disposed between the second equipment outlet and the third manifold.

In some embodiments, the valves are actuated via user input (e.g., manually operated, user input received via a network, etc.). In some embodiments, the valves are operated based on output of a trained machine learning model. In some embodiments, a machine learning model is trained based on historical sensor data and historical performance data.

Responsive to a surplus in locally generated electricity (e.g., via solar panels), the valves may be actuated to heat the water using an electric water heater. Responsive to a deficit in locally generated electricity (e.g., via solar panels), the valves may be actuated to heat the water using a natural gas water heater. In some embodiments, the water passes through two water heaters, where a first water heater heats the water and a second water heater is used as a holding tank and reheats the water if the water temperature drops.

The systems, devices, and methods of the present disclosure have advantages over conventional solutions. The present disclosure uses electricity when there is a surplus of locally generated electricity. The present disclosure uses other forms of energy (e.g., natural gas) when there is a deficit of locally generated electricity. This allows matching locally generated electricity with building energy demands which is more energy efficient and can be better for the environment. For example, the present disclosure can allow a building to use more locally generated electricity and to use less fossil fuels. The present disclosure also uses other forms of electricity when there is a surge price in the municipal electric grid and there may be a deficit of locally generated electricity.

Although certain embodiments of the present disclosure describe use of an electric water heater and a natural gas water heater, in some embodiments, other types of energy and other types of equipment can be used. The present disclosure can be used with radiant floor heating, radiant snow melt systems, electric heaters, heat pumps, hot water baseboard heating systems, oil furnaces, heating ventilation and air conditioning (HVAC) equipment, etc. The present disclosure can be used with equipment that use electricity, natural gas, propane, oil, combination of energy sources (e.g., hybrid), etc.

Although certain embodiments of the present disclosure describe use of locally generated electricity from solar panels, in some embodiments, other types of energy can be used. Other types of energy may be renewable energy that rely on fuel sources such as sun (i.e., solar), wind, moving water, organic plant and waste material (e.g., eligible biomass), biogas, the heat of the earth (e.g., geothermal), etc. Renewable energy may include resources that rely on fuel sources that restore themselves over short periods of time and do not diminish. Other types of energy may further include conventional power such as combustion of fossil fuels (e.g., coal, natural gas, oil, propane), nuclear fission (e.g., of uranium), etc. The present disclosure may include switching between use of renewable energy and conventional power based on energy demand, energy prices, and availability of energy sources.

FIGS. 1A-D illustrate solar board systems 100, according to certain embodiments. In some embodiments, the solar board system 100 is a solar board, smart hot water board system, hot water solar board system, hot water board smart, smart hot water solar board system, smart solar board system, smart board system, fluid board system, smart fluid board system, board system, and/or the like.

Referring to FIG. 1A, a solar board system 100 includes a board 108. The board 108 may be a rigid material (e.g., wood, plastic, plywood, metal, etc.). In some embodiments, the board 108 is mounted (e.g., fastened, bolted, screwed, nailed, etc.) to a substantially vertical surface (e.g., wall). In some embodiments, the board 108 is free-standing. In some embodiments, components of solar board system 100 are free-standing or mounted to something (e.g., a substantially vertical surface, a wall, etc.) other than a board 108.

The solar board system 100 includes manifolds 120 (e.g., cold manifold 120A, balance manifold 120B, and hot manifold 120C) mounted to the board 108. The manifolds 120 may be mounted via connectors (e.g., strips of metal) that go over the manifold 120 and are fastened to the board 108.

The solar board system 100 includes piping 122 that is connected to manifolds 120. The piping 122 may be mounted via connectors (e.g., strips of metal) that go over the piping 122 and are coupled to board 108 (e.g., fastened to the board 108, pass through holes in board 108, etc.). The piping 122 includes a cold water inlet 124 and a hot water outlet 126. In some embodiments, the cold water inlet 124 receives cold water at about 35-75 degrees Fahrenheit (e.g., ground water temperature). In some embodiments, the cold water inlet 124 receives cold water at about 50-60 degree Fahrenheit. In some embodiments, the hot water outlet 126 provides hot water at about 110-140 degrees Fahrenheit. In some embodiments, the hot water outlet 126 provides hot water at about 110-120 degrees Fahrenheit.

The solar board system 100 is coupled to at least two equipment 110. The solar board system 100 may be coupled to more than two equipment 110. Equipment 110 may be water heaters. In some examples, equipment 110A is an electric water heater (e.g., heats water via electricity) and equipment 110B is a natural gas water heater (e.g., heats water via natural gas). In some examples, equipment 110B is an electric water heater and equipment 110A is a natural gas water heater.

In some embodiments, at least one of equipment 110 receives energy (at least part of the time) via one or more renewable energy sources (e.g., solar panels, wind turbines, geothermal energy, etc.) and at least one of equipment 110 receives energy via conventional energy sources (e.g., fossil fuel, natural gas, propane, oil, etc.).

Solar board system 100 includes valves 106. Valves 106 are actuated (e.g., via input) to control flow of water to and/or from manifolds 120 and equipment 110. In some embodiments, valves 106 are actuated via input that is manual (e.g., valves 106 are manually actuated hand valves). In some embodiments, valves 106 are actuated by input via controller 102. The input can be user input that is transmitted via a client device to the controller 102 via a wireless network. The input can be automated input (e.g., based on output of a trained machine learning model).

Valves 106 may be actuated so that equipment 110 that heats water via electricity is used to heat the cold water when there is a surplus of locally generated electricity (e.g., more locally generated electricity than the building is using and the batteries are storing, locally generated electricity is to be sold back to the local electric company) and so that equipment 110 that heats water via natural gas is used to heat the cold water when there is a deficit of locally generated electricity (e.g., less locally generated electricity than the building is using, electricity is to be used from the local electric company). Valves 106 may be actuated so that equipment 110 that heats water via electricity is used to heat the cold water when there is not a surge in electricity pricing (e.g., during time that local electric company is charging a lower amount for electricity consumption) and so that equipment 110 that heats water via natural gas is used when there is a surge in electricity pricing (e.g., during time that local electric company is charging a higher amount for electricity consumption).

In some embodiments, solar board system 100 includes sensors 104 determine one or more of temperature, pressure, flow rate, etc. of water flowing through piping 122 and/or manifolds 120. The sensors 104 provide sensor data that may be used to control the valves 106 and/or equipment 110. Sensors 104 may be coupled to one or more of the manifolds 120 and/or other components of the solar board system 100.

In some embodiments, each equipment 110 includes a controller 112 and sensors 114. Sensors 114 may determine one or more of temperature, pressure, flow rate, water usage, heat loss rate, time to heat water stored in equipment 110, etc. Controller 112 may control equipment 110 to heat the water, not heat the water, heat to a predetermined temperature, heat once the temperature of the water is below a threshold temperature, etc. The controller 112 may receive instructions from controller 102 and/or a client device via a network (e.g., wireless network).

In some embodiments, manifold 120A receives cold water from cold water inlet via piping 122.

In some embodiments, manifold 120B is configured to receive hot water from equipment 110A responsive to valve 106A and a valve 106B being in an open position (e.g., and valves 106C-D being in the closed position). Valve 106A is disposed between the manifold 120A and equipment inlet of equipment 110A. Valve 106B is disposed between equipment outlet of equipment 110B and manifold 120B.

In some embodiments, manifold 120B is configured to provide cold water from manifold 120A to equipment 110B responsive to valve 106C and valve 106D being in the open position (e.g., and valves 106A-B being in the closed position). Valve 106C is disposed between manifold 120A and manifold 120B. Valve 106D is disposed between manifold 120B and equipment inlet of equipment 110B.

In some embodiments, manifold 120C is configured to receive hot water from manifold 120B responsive to valves 106A, 106B, and 106E being in the open position (e.g., and valves 106C, 106D, and/or 106F being in the closed position). Valve 106E is disposed between manifold 120B and manifold 120C.

In some embodiments, manifold 120C is configured to receive hot water from equipment 110B responsive to valves 106C, 106D, and 106F being in the open position (e.g., valves 106A, 106B, and/or 106E being in the closed position). Valve 106F is disposed between equipment outlet of equipment 110B and manifold 110C.

In some embodiments, manifold 120B mixes hot water received from equipment 110A and cold water received from manifold 120A (e.g., responsive to valves 106A-C being in the open position). The mixture of hot water and cold water may provide water at the temperature to be provided via hot water outlet 126 (e.g., equipment 110A may heat the water to a temperature greater than the temperature to be provided via hot water outlet 126).

In some embodiments, manifold 120C mixes water received from manifold 120B and water received from equipment 110B (e.g., responsive to valves 106A-F being in the open position). The mixture of water received from manifold 120B and water received from equipment 110B may provide water at the temperature to be provided via hot water outlet 126 (e.g., one of equipment 110A-B provides water at a temperature greater than the temperature to be provided at hot water outlet 126 and the other of equipment 110A-B provides water at a temperature less than the temperature to be provided at hot water outlet 126). In some embodiments, one or more of valves 106A-F are partially opened and/or are intermittently opened to control the flow of water through a portion of piping 122 (e.g., through equipment 110A and/or equipment 110B).

Although FIG. 1A illustrates two equipment 110, three manifolds 120, and six valves 106, more or less equipment 110, manifolds 120, and/or valves 106 may be used than those shown in FIG. 1A.

A valve 106 may be disposed between cold water inlet 124 and manifold 120A (e.g., or before cold water inlet 124) to be able to shut-off water flow to the solar board system 100. A valve 106 may be disposed between manifold 120C and hot water outlet 126 (e.g., or after hot water outlet 126) to be able to shut-off water flow from the solar board system 100. Valves 106 may be controlled to be able to remove equipment 110A or equipment 110B (e.g., for replacement, maintenance, etc.) while solar board system 100 still provides hot water via hot water outlet 126 (e.g., by being heated by the other equipment 110).

For a typical home, heating water may be about 15-20% of the total energy cost of the home. Water heaters may use one or more of thermal solar, geo-thermal, natural gas, propane, electricity, or oil to heat water. Advancements in technology has increased popularity of alternative sources of energy, such as geothermal, thermal solar, photovoltaic (PV) solar, etc. Geothermal is a process of harnessing the earth consistence heat to produce energy. Thermal solar energy is a processing of harnessing solar energy (i.e., from the sun) to generate thermal energy. Photovoltaic (PV) solar energy is a process that absorbs and converts sunlight into energy. Solar board system 100 allows a user to customize their most efficient combination of sources with which they heat their water.

In some embodiments, a thermal solar hot water tank and/or electric water heater may be added (e.g., as backup) to assist a natural gas water heater to be able to choose which water heater to heat the water. The solar board system 100 allows running of different water heaters (e.g., equipment 110A-B) in series or independently. In series may refer to using the first water heater (e.g., equipment 110A) to heat water (e.g., well water), the first water heater provides the water to the second water heater (e.g., equipment 110B) in series from the outlet (e.g., heated side) of the first water heater to the inlet (e.g., cold side) of the second water heater. The first water heater may do most or all of the heating load and the second water heater may be a holding tank. While being a holding tank, the second water heater would also have heating capabilities to supply hot water to the home as needed. Adjusting the solar board system 100 to run equipment independently includes adjusting valves 106. Also, valves 106 can be adjusted to assign one of equipment 110A-B to perform all of the water heating so that the other of equipment 110A-B can be removed for repair and/or replacement without hot water disruption to the home. The solar board system 100 allows use (e.g., by a home) of any source for hot water at any given time. In some embodiments, running water heaters in series with the solar board system 100 saves a large amount of energy and cost (e.g., in natural gas bills).

Manifold 120A (e.g., a blue manifold, cold manifold) is on the cold water inlet 124 side of the solar board system 100. In some embodiments, valves 106 are actuated to choose equipment 110A and/or equipment 110B for heating water. In some embodiments, manifold 120B (e.g., black manifold, balance manifold) may choose equipment 110A and/or equipment 110B for heating the water. Manifold 120C (e.g., red manifold, hot manifold) is on the hot water outlet 126 side of the solar board system 100 provide hot water to the home.

In some embodiments, the solar board system 100 is a manual valve board to choose the water heater source. In some embodiments, the solar board system 100 includes automated valves to heat water independently or in series. In some embodiments, solar board system 100 has a smart water heater option to shut down automatically responsive to detecting a leak or based on a schedule (e.g., fully programmable for time of day).

In some embodiments, when a solar energy system over produces, the day's excess energy goes back to the grid and becomes energy credits (e.g., kWh credits) on the electric bill that are typically for nighttime use (e.g., for those without a battery backup system). If those credits are not utilized, the utility company will pay out a low amount (e.g., about $0.02 to about $0.04 per credit) as compared to a higher cost to users (e.g., national average of about $0.11). The solar board system 100 shifts to all electric when over-producing, allowing use of every kWh credit and saving expense on natural gas.

Figure 1B:
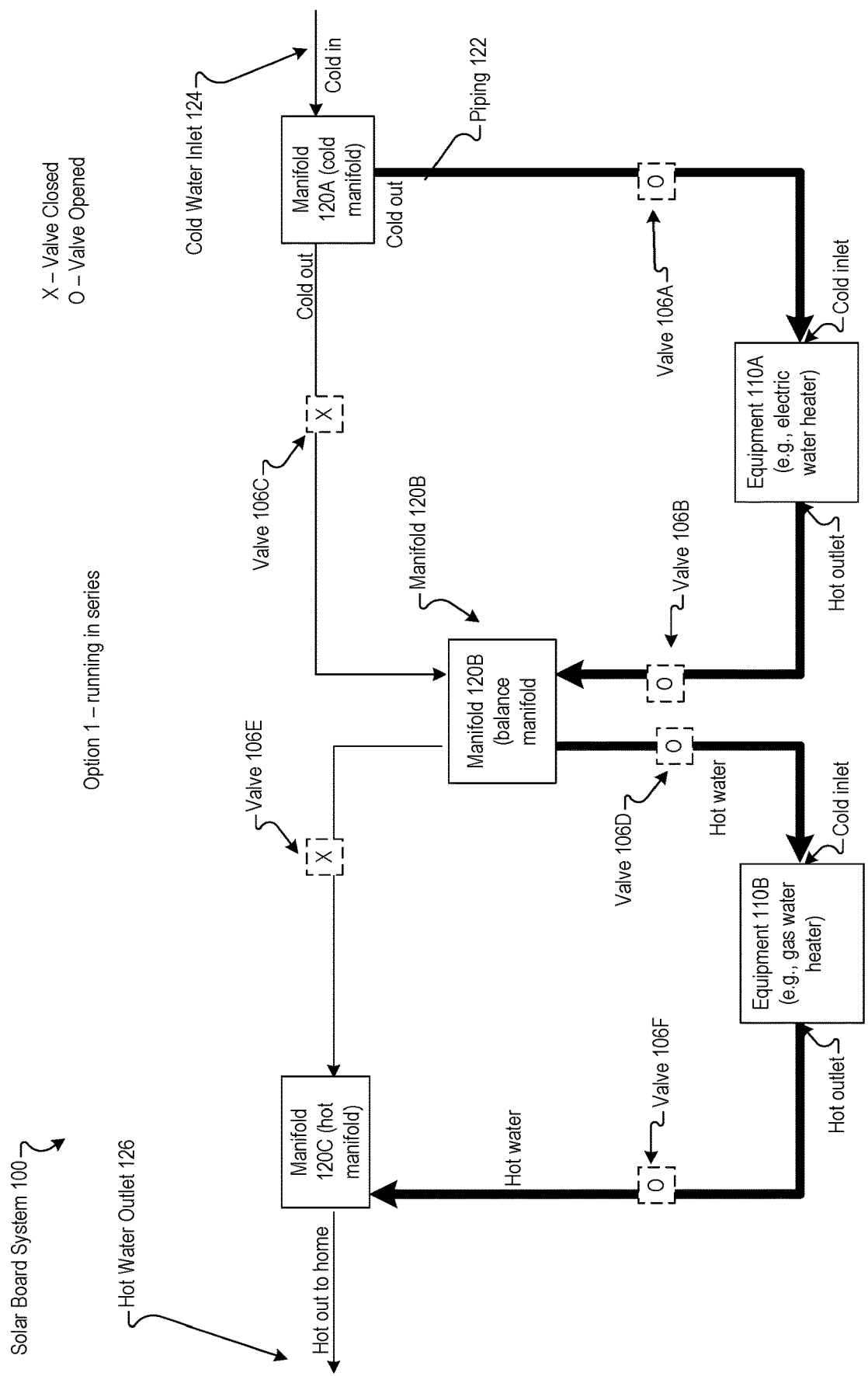
Figure 1C:
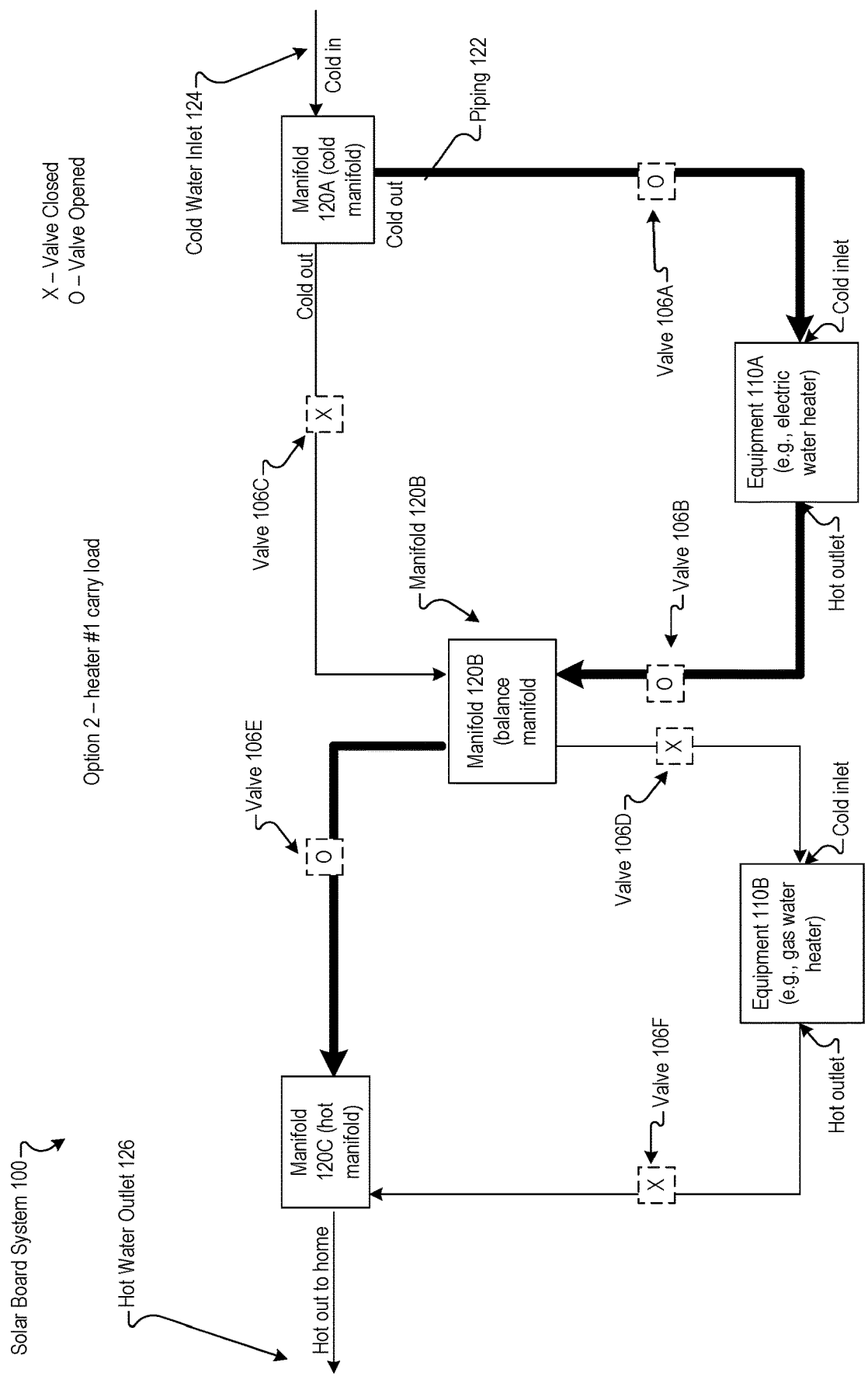
Figure 1D:
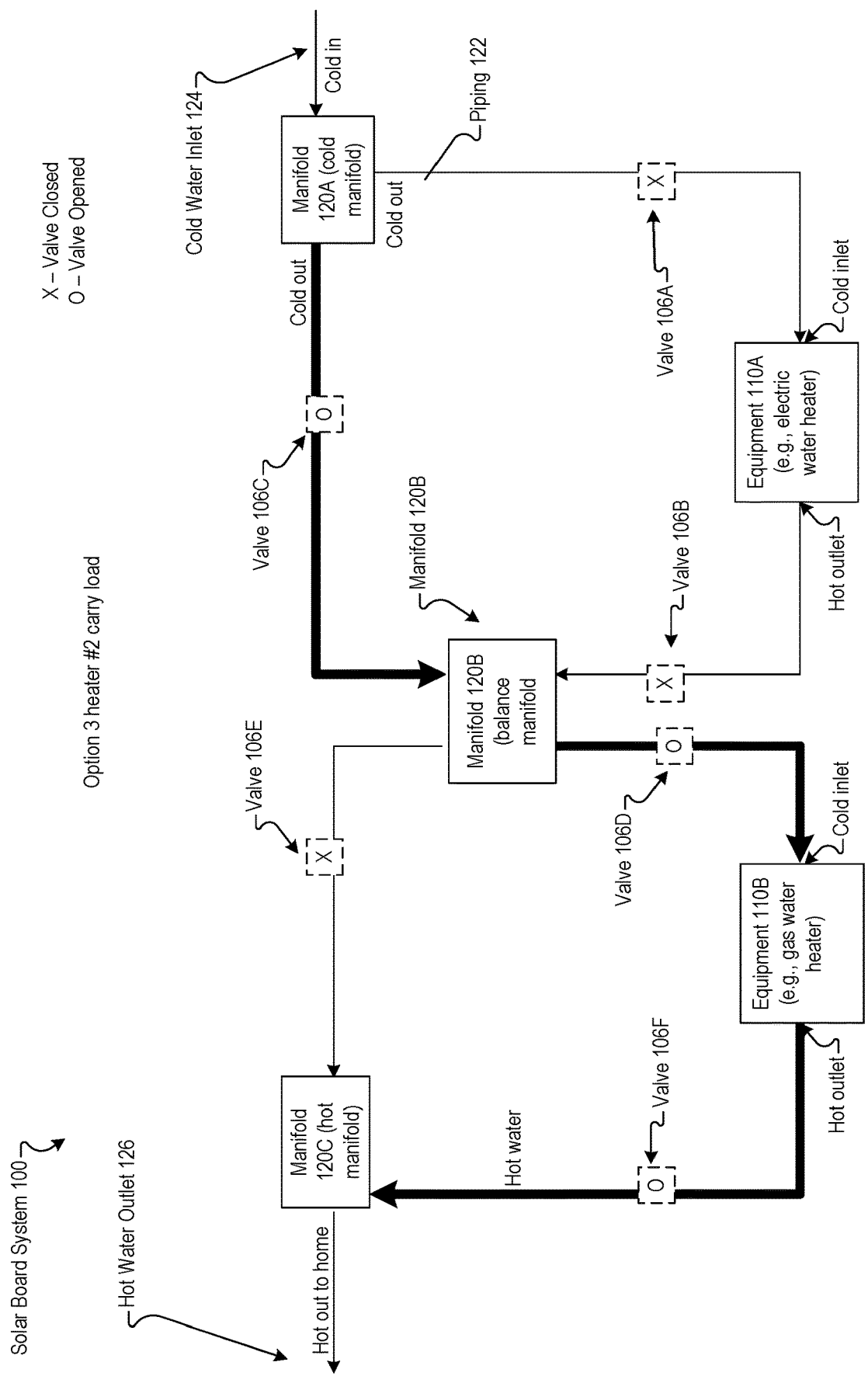

FIGS. 1B-D illustrate three different operating settings for the solar board system 100 (e.g., of FIG. 1A), according to certain embodiments. In some embodiments, a valve 106 illustrated in one or more of FIGS. 1B-D with a circle is in an open position and a valve 106 illustrated with an "x" in one or more of FIGS. 1B-D is in a closed position.

FIG. 1B illustrates Option 1 (e.g., equipment 110A and equipment 110B run in series), according to certain embodiments.

This setting allows both or as many equipment (e.g., hot water heaters (hwh)) as needed to run in series. In-Series, equipment 110A (e.g., hwh #1) handles all the hot water heating load. In some embodiments, the equipment 110B (e.g., natural gas hwh (#2)) is a hot water storage tank. The natural gas hwh will heat the water if needed in this setting.

FIG. 1C illustrates Option 2 (e.g., equipment 110A carries hot water load), according to certain embodiments.

In this setting the equipment 110A (e.g., electric hwh (#1)) handles all the homes hot water heating load. The equipment 110B (e.g., natural gas hwh (#2)) is isolated (e.g., completely isolated) or shut off from the home hot water supply. This could be used when changing out hwh #2 for repair or replacement. This setting is ideal to consume kWh net meter credits. No natural gas is used to heat hot water is this setting.

FIG. 1D illustrates Option 3 (e.g., equipment 110B carries hot water load), according to certain embodiments.

This setting is used for instance during a power failure or if natural gas is more efficient than electric. This option would be best during low solar production days or if there aren't any net metering credits. And again, if equipment 110A (e.g., hwh #1) needs to be repaired or replaced. No electric is used to heat hot water in this setting.

In some embodiments, in an additional option (e.g., equipment 110A and equipment 110B run in parallel), valves 106A-F are in the open position and manifold 120B directs water from valve 106C to valve 106D to be heated by equipment 110B and manifold 120B directs water from valve 106B to 106E so that that water is only heated by equipment 110A and not by equipment 110B.

The controller 102 may switch operation of the solar board system 100 between different options (e.g., Option 1, Option 2, Option 3, additional option, running in parallel, etc.) based on user input, sensor data, predicted data, etc. A user may switch operation of the solar board system 100 between different options (e.g., via manually actuating the valves, via user input to controller 102, via user input via a client device that wirelessly communicates with controller 102, etc.)

In some embodiments, solar board system 100 being coupled to multiple equipment 110 is able to provide more hot water to a building (e.g., more gallons per minute, more total gallons, etc.) than a conventional system. In some embodiments, the solar board system 100 uses the capacity of a first equipment 110 first and then uses the capacity of a second equipment 110. For example, an electric water heater may have a 100 gallon capacity and a natural gas water heater may have 60 gallon capacity. The solar board system 100 may use the 100 gallons of the electric water heater and then use the 60 gallons of the natural gas water heater (e.g., while the electric water heater heats the new cold water received in the tank of the electric water heater). In some embodiment a first equipment 110 (e.g., electric water heater) has a slower recovery (e.g., heating cold water received in the tank of the water heater) than second equipment 110. In some embodiments, the second equipment 110 that has quicker recovery provides the hot water while the first equipment 110 is recovering.

In some embodiments, a first equipment 110 is tankless (e.g., heats water as it flows through the water heater) and a second equipment 110 has a tank (e.g., heats water stored in the tank). The first equipment 110 that is tankless can be used while hot water demand does not exceed capacity of the first equipment 110 (e.g., gpm of demand does not exceed gpm of tankless water heater). Responsive to hot water demand exceeding capacity of the first equipment 110, second equipment 110 may be used (e.g., in series with first equipment 110 as shown in FIG. 1B, in parallel with first equipment 110, instead of first equipment 110, etc.).

Figure 2:
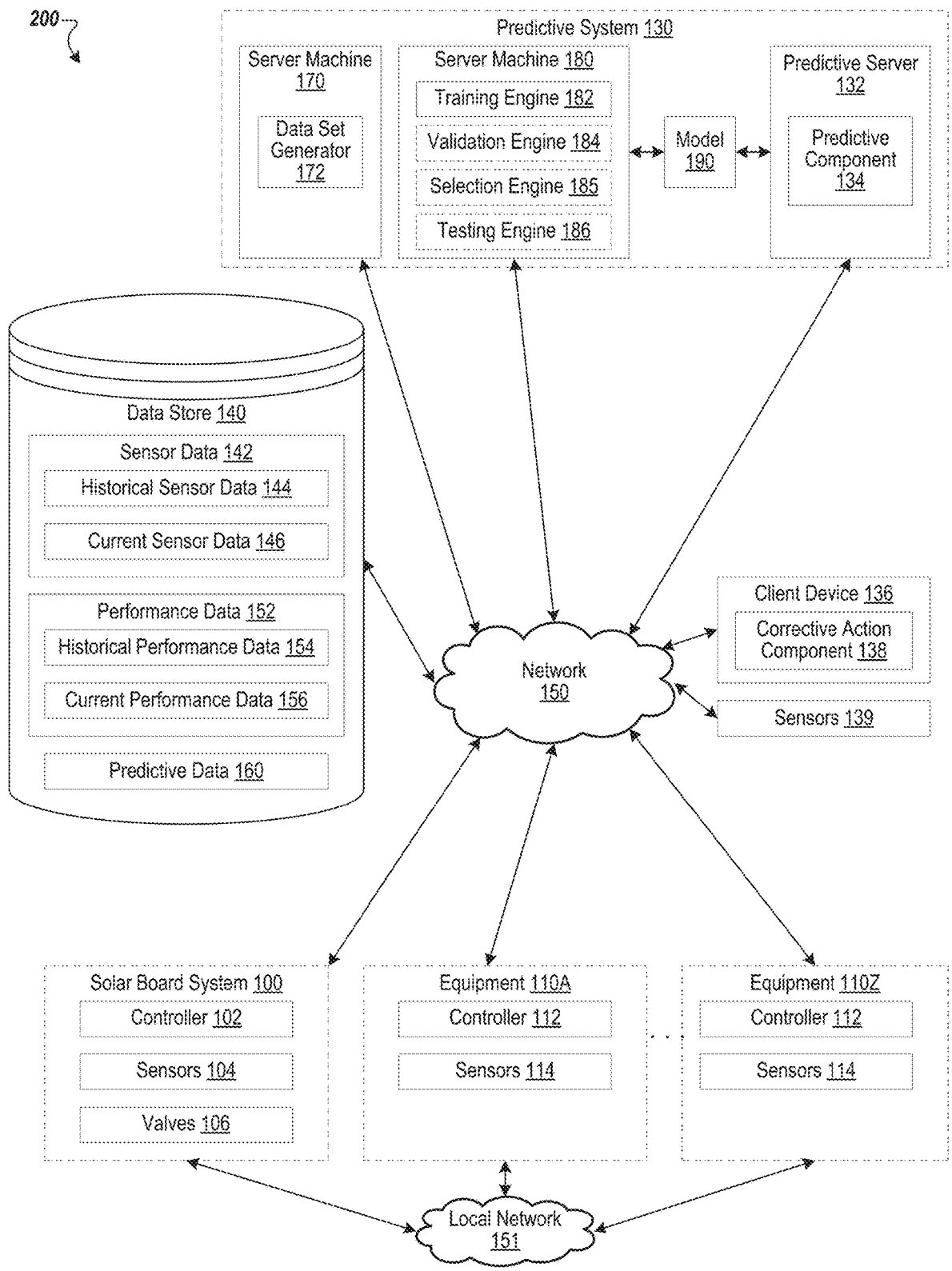
FIG. 2 is a block diagram illustrating an exemplary system architecture, according to certain embodiments.

FIG. 2 is a block diagram illustrating an exemplary system 200 (exemplary system architecture), according to certain embodiments. The system 200 includes a solar board system 100 (e.g., solar board system 100 of FIGS. 1A-D), equipment 110A-Z (e.g., equipment 110A-B of FIGS. 1A-D), predictive server 132, client device 136, sensors 139, and data store 140. In some embodiments, predictive server 132 is part of predictive system 130. In some embodiments, predictive system 130 further includes server machines 170 and 180.

In some embodiments, one or more of solar board system 100, equipment 110A-Z, client device 136, sensors 139, predictive server 132, data store 140, server machine 170, and/or server machine 180 are coupled to each other via a network 150 (e.g., for generating predictive data 160, for controlling solar board system 100 and/or equipment 110, for performing corrective actions, etc.). In some embodiments, network 150 is a public network that provides client device 136 with access to the solar board system 100, predictive server 132, data store 140, and other publically available computing devices. In some embodiments, network 150 is a private network that provides client device 136 access to solar board system 100, predictive server 132, data store 140, and other privately available computing devices. In some embodiments, network 150 includes one or more Wide Area Networks (WANs), Local Area Networks (LANs), wired networks (e.g., Ethernet network), wireless networks (e.g., an 802.11 network or a Wi-Fi® network), cellular networks (e.g., a Long Term Evolution (LTE) network), radar units, transmission antenna, reception antenna, microwave transmitter, microwave receiver, sonar devices, Lidar devices, routers, hubs, switches, server computers, cloud computing networks, and/or a combination thereof.

Solar board system 100 may include a controller 102 (e.g., see computer system 400 of FIG. 4), one or more sensors 104, and/or valves 106 (e.g., see FIG. 1A). In some embodiments, the sensors 104 provide sensor data 142 associated with the solar board system 100 (e.g., temperature, pressure, flow rate, etc. of water flowing through the solar board system 100, etc.).

Equipment 110 may each include controller 112 and sensors 114. In some embodiments, the sensors 114 provide sensor data 142 associated with the equipment 110 (e.g., temperature, pressure, flow rate, water usage, heat loss rate, time to heat water, etc.).

Sensors 139 provide sensor data 142 associated with a location (e.g., building) serviced by solar board system 100 and equipment 110. In some embodiments, solar board system 100 and equipment 110 provide hot water for a building, such as a home, an office, a factory, an industrial plant, etc. The building may have different sources of energy and/or sources of hot water. For example, a building may have equipment 110A that is an electric water heater and equipment 110B that is a natural gas water heater. The building may have locally generated energy (e.g., renewable energy from solar panels, wind turbines, etc.), municipal electric grid energy, natural gas energy, propane energy, oil energy, etc. The sensor data 142 from sensors 139 may include one or more of historical, current, and/or predicted weather data (e.g., sunlight data, wind data, etc.). The sensor data 142 from sensors 139 may include one or more of historical, current, and/or predicted energy usage data (e.g., electrical energy usage, natural gas energy usage, hot water usage, etc.). The sensor data 142 from sensors 139 may include one or more of historical, current, and/or predicted energy generation (e.g., electricity generated by solar, wind, etc.). The sensor data 142 from sensors 139 may include one or more of historical, current, and/or predicted occupancy data.

In some embodiments, the controller 102 controls the solar board system 100 and/or controller 112 controls equipment 110 based on the sensor data 142. In some embodiments, the controller 102 and/or controller 112 transmits the sensor data 142 to one or more of solar board system 100, equipment 110, client device 136, data store 140, predictive system 130, etc. In some embodiments, controller 102 and/or controller 112 receives instructions (e.g., to perform a corrective action) from one or more of solar board system 100, equipment 110, client device 136, data store 140, predictive system 130, etc. In some embodiments, controller 102 and/or controller 112 receives user input via a user interface of one or more of the solar board system 100, equipment 110, client device 136, predictive system 130, etc. to control the solar board system 100 and/or equipment 110.

In some embodiments, solar board system 100 and one or more equipment 110A-Z communicate with each other (e.g., via local network 151, via network 150). In some embodiments, solar board system 100 and/or equipment 110 receive data (e.g., instructions, schedule, sensor data, etc.) from one or more of predictive system 130, client device 136, data store 140, solar board system 100, and/or equipment 110 and provides the data to solar board system 100 and/or equipment 110. In some embodiments, solar board system 100 and/or equipment 110 receives data from one or more solar board system 100 and/or equipment 110 and provides the data to one or more of predictive system 130, client device 136, data store 140, solar board system 100, and/or equipment 110.

In some embodiments, solar board system 100 and equipment 110A-Z communicate over network 150. In some embodiments, solar board system 100 and equipment 110A-Z communicate over a local network 151. Local network 151 may be a computing network that provides one or more communication channels between solar board system 100 and equipment 110A-Z. In some examples, local network 151 is a peer-to-peer network that does not rely on a pre-existing network infrastructure (e.g., access points, switches, routers) and solar board system 100 and equipment 110A-Z replace the networking infrastructure to route communications between the solar board system 100 and equipment 110A-Z. Local network 151 may be a wireless network that is self-configuring and enables Solar board system 100 to contribute to local network 151 and dynamically connect and disconnect from local network 151 (e.g., ad hoc wireless network). In some examples, local network 151 is a computing network that includes networking infrastructure that enables solar board system 100 and equipment 110A-Z to communicate with other solar board system 100 and equipment 110A-Z. The local network 151 may or may not have access to the public network (e.g., internet, network 150). For example, an access point or device that may function as an access point to enable solar board system 100 and equipment 110A-Z to communicate with one another without providing internet access. In some embodiments, the local network 151 provides access to a larger network such as network 150 (e.g., Internet). In some embodiments, local network 151 is based on any wireless or wired communication technology and may connect solar board system 100 directly or indirectly (e.g., involving an intermediate device, such as an intermediate device) to equipment 110. The wireless communication technology may include Bluetooth®, Wi-Fi®, infrared, ultrasonic, or other technology. The wired communication may include universal serial bus (USB), Ethernet, RS 232, or other wired connection. The local network 151 may be an individual connection between solar board system 100 and equipment 110 or may include multiple connections.

In some embodiments, the client device 136 includes a computing device such as Personal Computers (PCs), laptops, mobile phones, smart phones, tablet computers, netbook computers, gateway device, etc. In some embodiments, the client device 136 includes a corrective action component 138. Client device 136 includes an operating system that allows users to one or more of generate, view, or edit data (e.g., selection of equipment 110, temperature of hot water, corrective actions associated with solar board system 100, etc.).

In some embodiments, corrective action component 138 receives user input (e.g., via a Graphical User Interface (GUI) displayed via the client device 136). In some embodiments, the corrective action component 138 transmits the user input to the predictive system 130, receives output (e.g., predictive data 160) from the predictive system 130, determines a corrective action associated with the solar board system 100 based on the output, and causes the corrective action to be implemented. In some embodiments, the corrective action component 138 obtains sensor data 142 (e.g., current sensor data 146) associated with the solar board system 100 (e.g., from data store 140, etc.) and provides the sensor data 142 (e.g., current sensor data 146) associated with the solar board system 100 to the predictive system 130. In some embodiments, the corrective action component 138 stores sensor data 142 in the data store 140 and the predictive server 132 retrieves the sensor data 142 from the data store 140. In some embodiments, the predictive server 132 stores output (e.g., predictive data 160) of the trained machine learning model 190 in the data store 140 and the client device 136 retrieves the output from the data store 140. In some embodiments, the corrective action component 138 receives an indication of a corrective action from the predictive system 130 and causes the corrective action to be implemented.

In some embodiments, a corrective action is associated with one or more of Computational Process Control (CPC), Statistical Process Control (SPC) (e.g., SPC to compare to a graph of 3-sigma, etc.), Advanced Process Control (APC), model-based process control, preventative operative maintenance, design optimization, updating of operating parameters, feedback control, machine learning modification, or the like.

In some embodiments, the corrective action includes actuating valves 106 to use one or more of the equipment 110. In some embodiments, the corrective action includes actuating (e.g., turning on or off) one or more of equipment 110 that are in series (e.g., turning off electrical water heater so that the natural gas water heater heats the water). In some embodiments, the corrective action includes providing an alert. An alert can include an alarm to replace or repair a component of the solar board system 100 or equipment 110 if the predictive data 160 indicates a predicted abnormality, such as a water leak, an abnormality of the water flow, an abnormality of a component of solar board system 100 or equipment 110, or the like. An alert can include a recommendation to add additional batteries (e.g., to store locally produced electricity), add additional solar panels (e.g., to provide more locally produced electricity), replace a component or equipment 110, perform maintenance, etc. In some embodiments, the corrective action includes providing feedback control (e.g., modifying operations responsive to the predictive data 160 indicating a predicted abnormality). In some embodiments, the corrective action includes providing machine learning (e.g., causing repair or replacement of a component of solar board system 100 or equipment 110 based on the predictive data 160). In some embodiments, performance of the corrective action includes causing updates to one or more operating parameters of one or more components of the solar board system 100 or equipment 110. In some embodiments, the corrective action includes causing preventative maintenance.

In some embodiments, the predictive server 132, server machine 170, and server machine 180 each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

The predictive server 132 includes a predictive component 134. In some embodiments, the predictive component 134 receives sensor data 142 (e.g., receive from the client device 136, retrieve from the data store 140) and generates output (e.g., predictive data 160) for performing corrective action associated with the solar board system 100 based on the sensor data 142. In some embodiments, the predictive component 134 uses one or more trained machine learning models 190 to determine the output for performing the corrective action based on the sensor data 142. In some embodiments, trained machine learning model 190 is trained using historical sensor data 144 and historical performance data 154.

In some embodiments, the predictive system 130 (e.g., predictive server 132, predictive component 134) generates predictive data 160 using supervised machine learning (e.g., supervised data set, labeled data, etc.). In some embodiments, the predictive system 130 generates predictive data 160 using semi-supervised learning (e.g., semi-supervised data set, a predictive percentage, etc.). In some embodiments, the predictive system 130 generates predictive data 160 using unsupervised machine learning (e.g., unsupervised data set, clustering, etc.).

In some embodiments, sensors 104, 114, and/or sensors 139 provide sensor data 142 (e.g., historical sensor data 144, current sensor data 146) associated with solar board system 100. In some embodiments, sensors 104, 114, and/or sensors 139 include one or more of a pressure sensor, a flow sensor, a temperature sensor, a humidity sensor, a barometer, a light-sensing sensor, an imaging device, electrical current sensor, voltage sensor, a location sensor (e.g., global positioning system (GPS) device), irradiance sensor, sun meter, light meter, and/or the like. In some embodiments, sensors 104, 114, and/or sensors 139 provide the sensor data 142 during operation of the solar board system 100 and/or equipment 110 (e.g., during flow of water, during heating of water, etc.). In some embodiments, the sensor data 142 is used for determining equipment health, water conditioning, energy usage, and/or the like. The sensor data 142 is received over a period of time.

In some embodiments, sensor data 142 is associated with or indicative of operating parameters such as hardware parameters (e.g., settings or components (e.g., size, type, etc.) of the solar board system 100 and/or equipment 110) or process parameters of the solar board system 100 and/or equipment. In some embodiments, sensor data 142 is provided while the solar board system 100 and/or equipment 110 performs operations (e.g., during flow of water, during heating of water, etc.), before the solar board system 100 and/or equipment 110 performs operations, and/or after the solar board system 100 and/or equipment 110 performs operations.

In some embodiments, the sensor data 142 (e.g., historical sensor data 144, current sensor data 146, etc.) is processed (e.g., by the client device 136 and/or by the predictive server 132). In some embodiments, processing of the sensor data 142 includes generating features. In some embodiments, the features are a pattern in the sensor data 142 (e.g., slope, width, height, peak, etc.) or a combination of sensor values from the sensor data 142 (e.g., power derived from voltage and current, etc.). In some embodiments, the sensor data 142 includes features and the features are used by the predictive component 134 for obtaining predictive data 160 for performance of a corrective action.

In some embodiments, the data store 140 is memory (e.g., random access memory), a drive (e.g., a hard drive, a flash drive), a database system, or another type of component or device capable of storing data. In some embodiments, data store 140 includes multiple storage components (e.g., multiple drives or multiple databases) that span multiple computing devices (e.g., multiple server computers). In some embodiments, the data store 140 stores one or more of sensor data 142, performance data 152, and/or predictive data 160.

Sensor data 142 includes historical sensor data 144 and current sensor data 146. In some embodiments, the sensor data 142 includes flow rate, temperature, pressure, energy usage, energy generated, hot water used, energy loss, weather data, and/or the like. In some embodiments, the corrective action is associated with a difference between the sensor data 142 (e.g., difference between energy generated and energy used).

Performance data 152 includes historical performance data 154 and current performance data 156. In some embodiments, the performance data 152 is data (e.g., sensor data 142) associated with the solar board system 100 after performance of a corrective action. In some examples, the performance data 152 is pressure data, flowrate data, temperature data, and/or the like (e.g., after performance of a corrective action). In some embodiments, performance data 152 includes data associated with the corrective action performed (e.g., actuation of valves 106, type of repair or replacement of a component, historical corrective actions, current corrective actions, etc.). In some embodiments, the performance data 152 is a difference between energy generated and energy used. In some embodiments, the performance data 152 is a total cost of energy used.

Historical data includes one or more of historical sensor data 144 and/or historical performance data 154 (e.g., at least a portion for training the machine learning model 190). Current data includes one or more of current sensor data 146 and/or current performance data 156 (e.g., at least a portion to be input into the trained machine learning model 190 subsequent to training the model 190 using the historical data) for which predictive data 160 is generated (e.g., for performing corrective actions). In some embodiments, the current data is used for retaining the trained machine learning model 190.

In some embodiments, predictive data 160 is associated with predictive performance data of the solar board system 100 (e.g., predicted energy usage, predicted energy generation, predicted difference between energy generated and energy used, and/or the like). In some embodiments, the predictive data 160 is predictive performance data of the solar board system 100 after performing a particular corrective action.

In some embodiments, predictive system 130 further includes server machine 170 and server machine 180. Server machine 170 includes a data set generator 172 that is capable of generating data sets (e.g., a set of data inputs and a set of target outputs) to train, validate, and/or test a machine learning model(s) 190. In some embodiments, the data set generator 172 partitions the historical data (e.g., historical sensor data 144 and historical performance data 154) into a training set (e.g., sixty percent of the historical data), a validating set (e.g., twenty percent of the historical data), and a testing set (e.g., twenty percent of the historical data). In some embodiments, the predictive system 130 (e.g., via predictive component 134) generates multiple sets of features. In some examples, a first set of features corresponds to a first set of types of sensor data 142 (e.g., from a first set of sensors, first combination of values from first set of sensors, first patterns in the values from the first set of sensors) that correspond to each of the data sets (e.g., training set, validation set, and testing set) and a second set of features correspond to a second set of types of sensor data (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. In some embodiments, an engine (e.g., training engine 182, a validation engine 184, selection engine 185, and a testing engine 186) refers to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 is capable of training a machine learning model 190 using one or more sets of features associated with the training set from data set generator 172. In some embodiments, the training engine 182 generates multiple trained machine learning models 190, where each trained machine learning model 190 corresponds to a distinct set of features of the training set (e.g., sensor data from a distinct set of sensors). In some examples, a first trained machine learning model was trained using all features (e.g., X1-X5), a second trained machine learning model was trained using a first subset of the features (e.g., X1, X2, X4), and a third trained machine learning model was trained using a second subset of the features (e.g., X1, X3, X4, and X5) that partially overlaps the first subset of features.

The validation engine 184 is capable of validating a trained machine learning model 190 using a corresponding set of features of the validation set from data set generator 172. For example, a first trained machine learning model 190 that was trained using a first set of features of the training set is validated using the first set of features of the validation set. The validation engine 184 determines an accuracy of each of the trained machine learning models 190 based on the corresponding sets of features of the validation set. The validation engine 184 discards trained machine learning models 190 that have an accuracy that does not meet a threshold accuracy. In some embodiments, the selection engine 185 is capable of selecting one or more trained machine learning models 190 that have an accuracy that meets a threshold accuracy. In some embodiments, the selection engine 185 is capable of selecting the trained machine learning model 190 that has the highest accuracy of the trained machine learning models 190.

The testing engine 186 is capable of testing a trained machine learning model 190 using a corresponding set of features of a testing set from data set generator 172. For example, a first trained machine learning model 190 that was trained using a first set of features of the training set is tested using the first set of features of the testing set. The testing engine 186 determines a trained machine learning model 190 that has the highest accuracy of all of the trained machine learning models based on the testing sets.

In some embodiments, the machine learning model 190 refers to the model artifact that is created by the training engine 182 using a training set that includes data inputs and corresponding target outputs (correct answers for respective training inputs). Patterns in the data sets can be found that map the data input to the target output (the correct answer), and the machine learning model 190 is provided mappings that captures these patterns. In some embodiments, the machine learning model 190 uses one or more of Support Vector Machine (SVM), Radial Basis Function (RBF), clustering, supervised machine learning, semi-supervised machine learning, unsupervised machine learning, k-Nearest Neighbor algorithm (k-NN), linear regression, random forest, neural network (e.g., artificial neural network), etc. In some embodiments, the machine learning model 190 is a multi-variable analysis (MVA) model.

Predictive component 134 provides current sensor data 146 to the trained machine learning model 190 and runs the trained machine learning model 190 on the input to obtain one or more outputs. The predictive component 134 is capable of determining (e.g., extracting) predictive data 160 from the output of the trained machine learning model 190 and determines (e.g., extracts) confidence data from the output that indicates a level of confidence that the predictive data 160 corresponds to current performance data 156 (e.g., model 190) of the solar board system 100 at the current sensor data 146. In some embodiments, the predictive component 134 or corrective action component 138 use the confidence data to decide whether to cause a corrective action associated with the solar board system 100 based on the predictive data 160.

The confidence data includes or indicates a level of confidence that the predictive data 160 corresponds to current performance data 156 (e.g., model 190) of the solar board system 100 at the current sensor data 146. In one example, the level of confidence is a real number between 0 and 1 inclusive, where 0 indicates no confidence that the predictive data 160 corresponds to current performance data 156 associated with the current sensor data 146 and 1 indicates absolute confidence that the predictive data 160 corresponds to current performance data 156 associated with the current sensor data 146. Responsive to the confidence data indicating a level of confidence below a threshold level for a predetermined number of instances (e.g., percentage of instances, frequency of instances, total number of instances, etc.) the predictive component 134 causes the trained machine learning model 190 to be re-trained (e.g., based on the current sensor data 146 and current performance data 156, etc.).

For purpose of illustration, rather than limitation, aspects of the disclosure describe the training of one or more machine learning models 190 using historical data (e.g., historical sensor data 144 and historical performance data 154) and inputting current data (e.g., current sensor data 146) into the one or more trained machine learning models 190 to determine predictive data 160 (e.g., predicting current performance data 156). In other implementations, a heuristic model or rule-based model is used to determine predictive data 160 (e.g., without using a trained machine learning model). Predictive component 134 monitors historical sensor data 144 and historical performance data 154. In some embodiments, any of the information described with respect to data inputs of data set generator 172 are monitored or otherwise used in the heuristic or rule-based model.

In some embodiments, the functions of client device 136, predictive server 132, server machine 170, and server machine 180 are be provided by a fewer number of machines. For example, in some embodiments, server machines 170 and 180 are integrated into a single machine, while in some other embodiments, server machine 170, server machine 180, and predictive server 132 are integrated into a single machine. In some embodiments, client device 136 and predictive server 132 are integrated into a single machine.

In general, functions described in one embodiment as being performed by client device 136, predictive server 132, server machine 170, and server machine 180 can also be performed on predictive server 132 in other embodiments, if appropriate. In addition, the functionality attributed to a particular component can be performed by different or multiple components operating together. For example, in some embodiments, the predictive server 132 determines the corrective action based on the predictive data 160. In another example, client device 136 determines the predictive data 160 based on output from the trained machine learning model.

In some embodiments, the corrective action component 138 is part of the predictive system 130 (e.g., predictive server 132). In some embodiments, the predictive component 134 is part of the client device 136. In some embodiments, the corrective action component 138 and/or the predictive component 134 is part of the controller 102 of a solar board system 100.

In addition, the functions of a particular component can be performed by different or multiple components operating together. In some embodiments, one or more of the predictive server 132, server machine 170, or server machine 180 are accessed as a service provided to other systems or devices through appropriate application programming interfaces (API).

In some embodiments, a "user" is represented as a single individual. However, other embodiments of the disclosure encompass a "user" being an entity controlled by a plurality of users and/or an automated source. In some examples, a set of individual users federated as a group of administrators is considered a "user."

Although embodiments of the disclosure are discussed in terms of generating predictive data 160 to perform a corrective action associated with the solar board system 100, in some embodiments, the disclosure can also be generally applied to verifying correct operation of components and production of product. Embodiments can be generally applied to verifying correct operation and production based on different types of data.

Figure 3A:
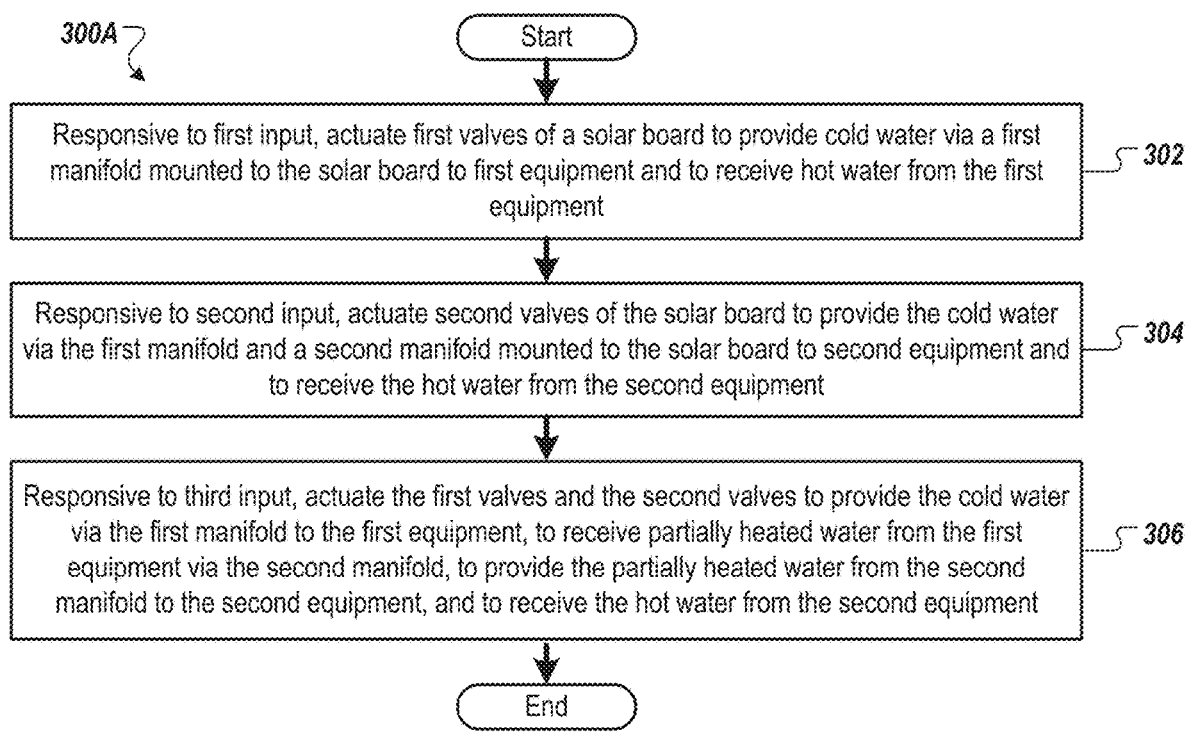
FIGS. 3A-C illustrate flow diagrams of methods associated with solar board systems, according to certain embodiments.
Figure 3B:
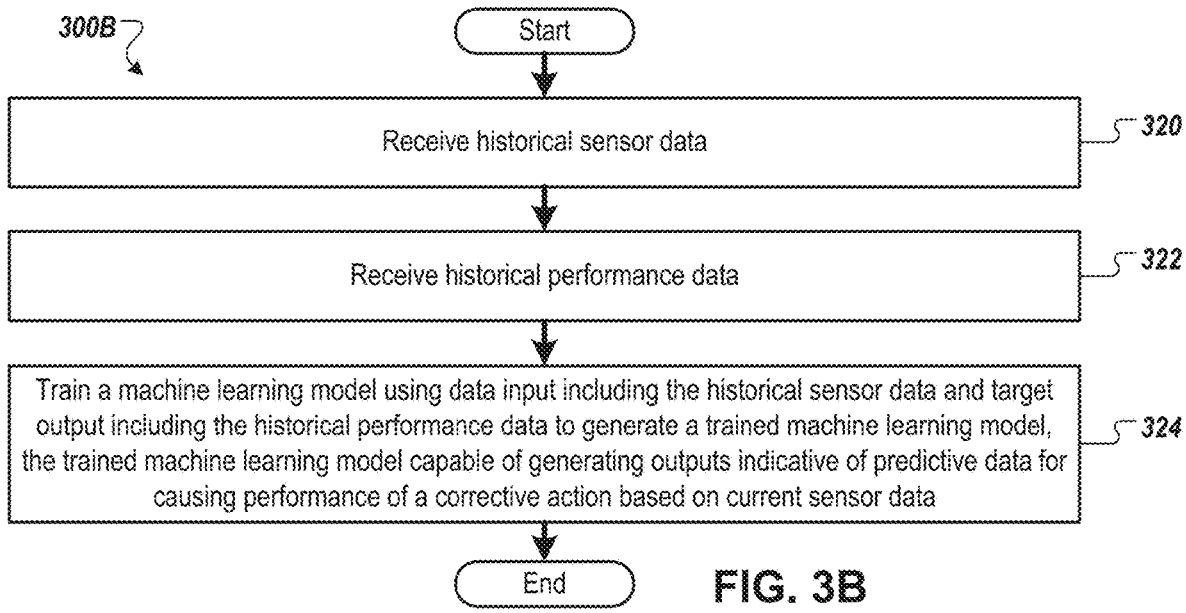
Figure 3C:
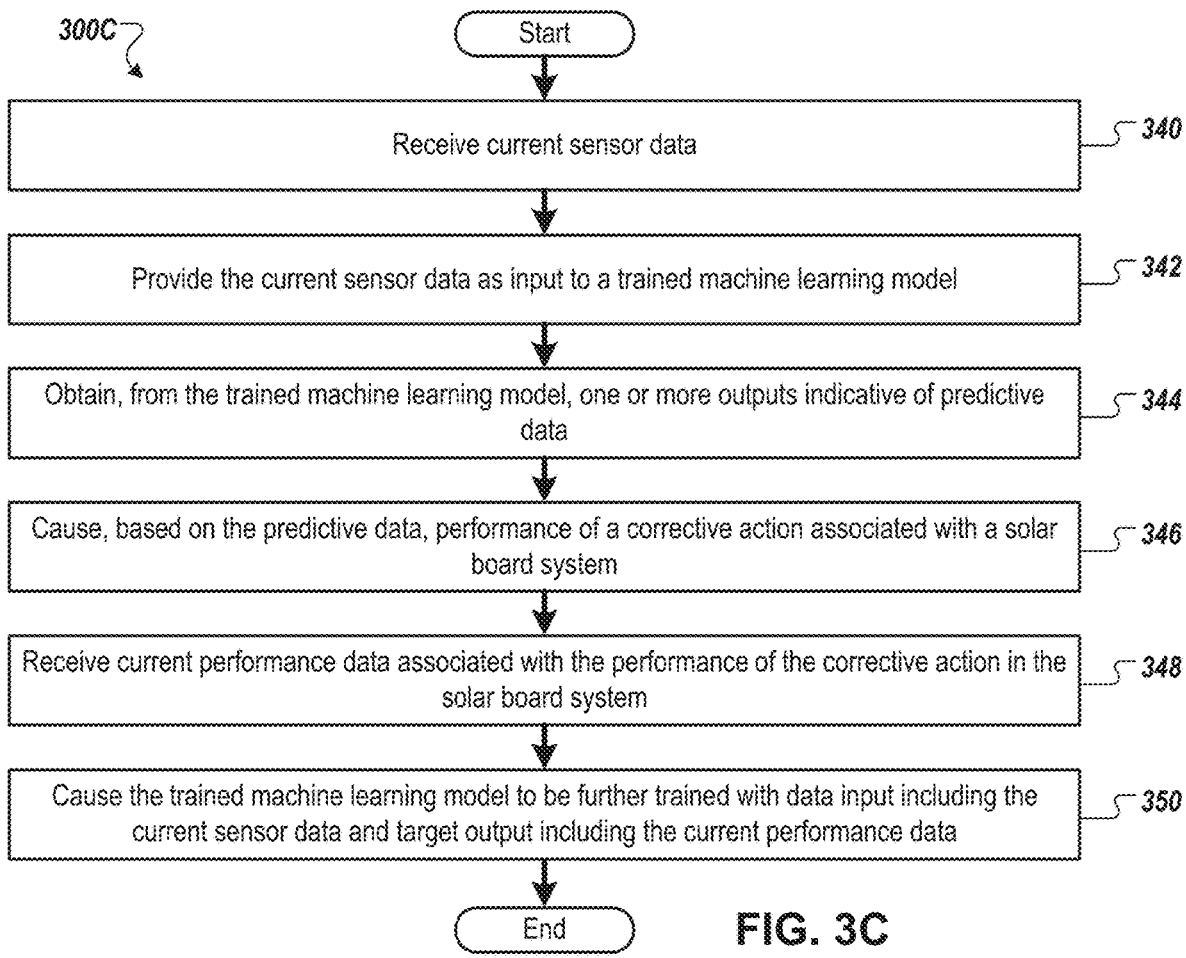

FIGS. 3A-C illustrate flow diagrams of methods 300A-C associated with solar board systems, according to certain embodiments. In some embodiments, methods 300A-C are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, one or more of methods 300A-C are performed, at least in part, by predictive system 130, client device 136, controller 102 of solar board system 100, and/or controller 112 of equipment 110. In some embodiments, method 300A is performed by controller 102, predictive system 130, and/or manually. In some embodiments, method 300B is performed by server machine 180 (e.g., training engine 182, etc.). In some embodiments, method 300C is performed by predictive server 132 (e.g., predictive component 134). In some embodiments, a non-transitory machine-readable storage medium stores instructions that when executed by a processing device (e.g., processing device of predictive system 130, of server machine 180, of predictive server 132, of client device 136, of controller 102, of controller 112, etc.), cause the processing device to perform one or more of methods 300A-C.

For simplicity of explanation, methods 300A-C are depicted and described as a series of operations. However, operations in accordance with this disclosure can occur in various orders and/or concurrently and with other operations not presented and described herein. Furthermore, in some embodiments, not all illustrated operations are performed to implement methods 300A-C in accordance with the disclosed subject matter. In addition, those skilled in the art will understand and appreciate that methods 300A-C could alternatively be represented as a series of interrelated states via a state diagram or events.

FIG. 3A is a flow diagram of a method 300A associated with control of a solar board system (e.g., solar board system 100A-B of FIGS. 1-2), according to certain embodiments. In some embodiments, one or more operations of method 300A are performed by controller 102 of FIGS. 1-2, controller 112 of FIGS. 1-2, predictive system 130 of FIG. 2, predictive server 132 of FIG. 2, and/or client device 136 of FIG. 2. In some embodiments, one or more operations of method 300A are via manual operation.

Referring to FIG. 3A, at block 302, responsive to first input, first valves of a solar board are actuated (e.g., via processing logic, via controller 102, manually, etc.) to provide cold water via a first manifold mounted to the solar board to first equipment and to receive hot water from the first equipment. In some embodiments, block 302 includes actuating valves 106A, 106B, and 106E of FIG. 1A to be in the open position and actuating valves 106C, 106D, and 106F of FIG. 1A to be in the closed position.

At block 304, responsive to second input, second valves of the solar board are actuated (e.g., via processing logic, via controller 102, manually, etc.) to provide cold water via the first manifold and a second manifold mounted to the solar board to second equipment and to receive the hot water from the second equipment. In some embodiments, block 304 includes actuating valves 106C, 106D, and 106F of FIG. 1A to be in the open position and actuating valves 106A, 106B, and 106E of FIG. 1A to be in the closed position.

At block 306, responsive to third input, first valves and second valves of the solar board are actuated (e.g., via processing logic, via controller 102, manually, etc.) to provide cold water via the first manifold to first equipment, to receive partially heated water from the first equipment via the second manifold, to provide the partially heated water from the second manifold to the second equipment, and to receive the hot water from the second equipment. In some embodiments, block 306 includes actuating valves 106A, 106B, 106D, and 106F of FIG. 1A to be in the open position and actuating valves 106C and 106E of FIG. 1A to be in the closed position.

In some embodiments, first input, second input, and/or third input are to maximize usage of locally generated energy (e.g., solar energy) and minimize usage of municipal electrical grid. In some embodiments, processing logic may control additional equipment other than water heaters to maximize usage of locally generated energy (e.g., solar energy) and minimize usage of municipal electrical grid. For example, the processing logic may use electric HVAC equipment responsive to locally generated energy surplus or fossil fuel HVAC equipment responsive to locally generated energy deficit.

In some embodiments, one or more of first input, second input, and/or third input are associated with an energy outage (e.g., municipal electrical grid not providing electricity), batteries having a charge that is below a threshold amount (e.g., below 20% charge), and/or the like. For example, a processing device may determine, based on sensor data (e.g., of a gateway sensor of a solar energy battery), that a municipal electrical grid is not providing electricity and may cause the valves to be actuated to use natural gas equipment (e.g., natural gas water heater) and not electrical equipment (e.g., electrical water heater). In some embodiments, the processing device may cause the electrical equipment to be powered down.

In some embodiments, first input, second input, and/or third input are via manually controlling valves. In some embodiments, first input, second input, and/or third input are received by a controller (e.g., controller 102) coupled to valves via a network from a client device (e.g., client device 136) or server (e.g., predictive server 132). In some embodiments, the input is determined based on output of a trained machine learning model (e.g., trained via method 300B of FIG. 3B and used via method 300C of FIG. 3C).

FIG. 3B is a method for training a machine learning model (e.g., model 190 of FIG. 2) for determining predictive data (e.g., predictive data 160 of FIG. 2) to perform a corrective action associated with a solar board system (e.g., solar board system 100 of FIGS. 1A-2), according to certain embodiments.

Referring to FIG. 3B, at block 320 of method 300B, the processing logic receives historical sensor data (e.g., historical sensor data 144 of FIG. 2). In some embodiments, the historical sensor data includes one or more of historical valve actuation data, historical flow rate data, historical temperature data, historical pressure data, historical weather data (e.g., solar irradiance data, cloud coverage data, wind data, etc.), historical energy usage data, historical local energy generation data (e.g., solar energy generation), historical hot water usage data, historical water heating data, etc.

At block 322, the processing logic receives historical performance data (e.g., historical performance data 154 of FIG. 2). The historical performance data may include one or more of historical locally generated energy deficit data, historical locally generated energy surplus data, historical municipal electrical grid usage data, historical surplus price energy usage data, etc.

At block 324, the processing logic trains a machine learning model using data input including the historical sensor data and target output including the historical performance data to generate a trained machine learning model. The trained machine learning model is capable of receiving current sensor data (e.g., see block 342 of FIG. 3C) to generate outputs indicative of predictive data (e.g., predictive data 160, see block 344 of FIG. 3C) to cause performance of one or more corrective actions (e.g., based on current sensor data) associated with the solar board system (e.g., see block 348 of FIG. 3C).

FIG. 3C is a method 300C for using a trained machine learning model (e.g., model 190 of FIG. 2) for determining predictive data to cause performance of a corrective action associated with a solar board system, according to certain embodiments.

Referring to FIG. 3C, at block 340 of method 300C, the processing logic receives current sensor data (e.g., current sensor data 146 of FIG. 2). The current sensor data may include one or more of current valve actuation data, current flow rate data, current temperature data, current pressure data, current weather data (e.g., solar irradiance data, cloud coverage data, wind data, etc.), current energy usage data, current local energy generation data (e.g., solar energy generation), current hot water usage data, current water heating data, etc.

At block 342, the processing logic provides the current sensor data as input to a trained machine learning model (e.g., the trained machine learning model of block 324 of FIG. 3B).

At block 344, the processing logic obtains, from the trained machine learning model, one or more outputs indicative of predictive data. In some embodiments, the predictive data is associated with predicted performance data resulting from performance of one or more corrective actions, lack of performance of a corrective action, a schedule of performing corrective actions, type of corrective actions, and/or the like. In some embodiments, the predictive data includes one or more of predicted locally generated energy deficit data, predicted locally generated energy surplus data, predicted municipal electrical grid usage data, predicted surplus price energy usage data, etc.

At block 346, the processing logic causes, based on the one or more outputs (e.g., predictive data), performance of a corrective action associated with the solar board system. In some embodiments, the corrective action includes actuating one or more valves of the solar board system and/or using one or more equipment (e.g., turning off the electrical water heater that is in series with the natural gas water heater) to heat water to reduce or eliminate one or more of locally generated energy deficit (e.g., electricity usage is greater than locally generated electricity and electricity stored in batteries), locally generated energy surplus (e.g., amount of locally generated energy exceeds electricity usage and battery capacity), municipal electrical grid usage, and/or surplus price energy usage. In some embodiments, the corrective action includes providing an alert that recommends adding battery capacity, adding solar panels, replacing a component or equipment, performing maintenance, decreasing energy usage, decreasing hot water usage, etc.

At block 348, processing logic receives current performance data (e.g., current performance data 156 of FIG. 2) associated with the solar board system (e.g., associated with the current sensor data from block 340). In some embodiments, the current performance data is associated with operation of the solar board system after the performance of the corrective action. In some embodiments, the current performance data received is different from the predicted data and in some embodiments, the current performance data is substantially similar to the predicted data. In some embodiments, the current performance data is one or more of current locally generated energy deficit data, current locally generated energy surplus data, current municipal electrical grid usage data, current surplus price energy usage data, etc.

At block 350, processing logic causes the trained machine learning model to be further trained (e.g., re-trained) with data input including the current sensor data (e.g., from block 340) and target output including the current performance data (e.g., from block 348).

Figure 4:
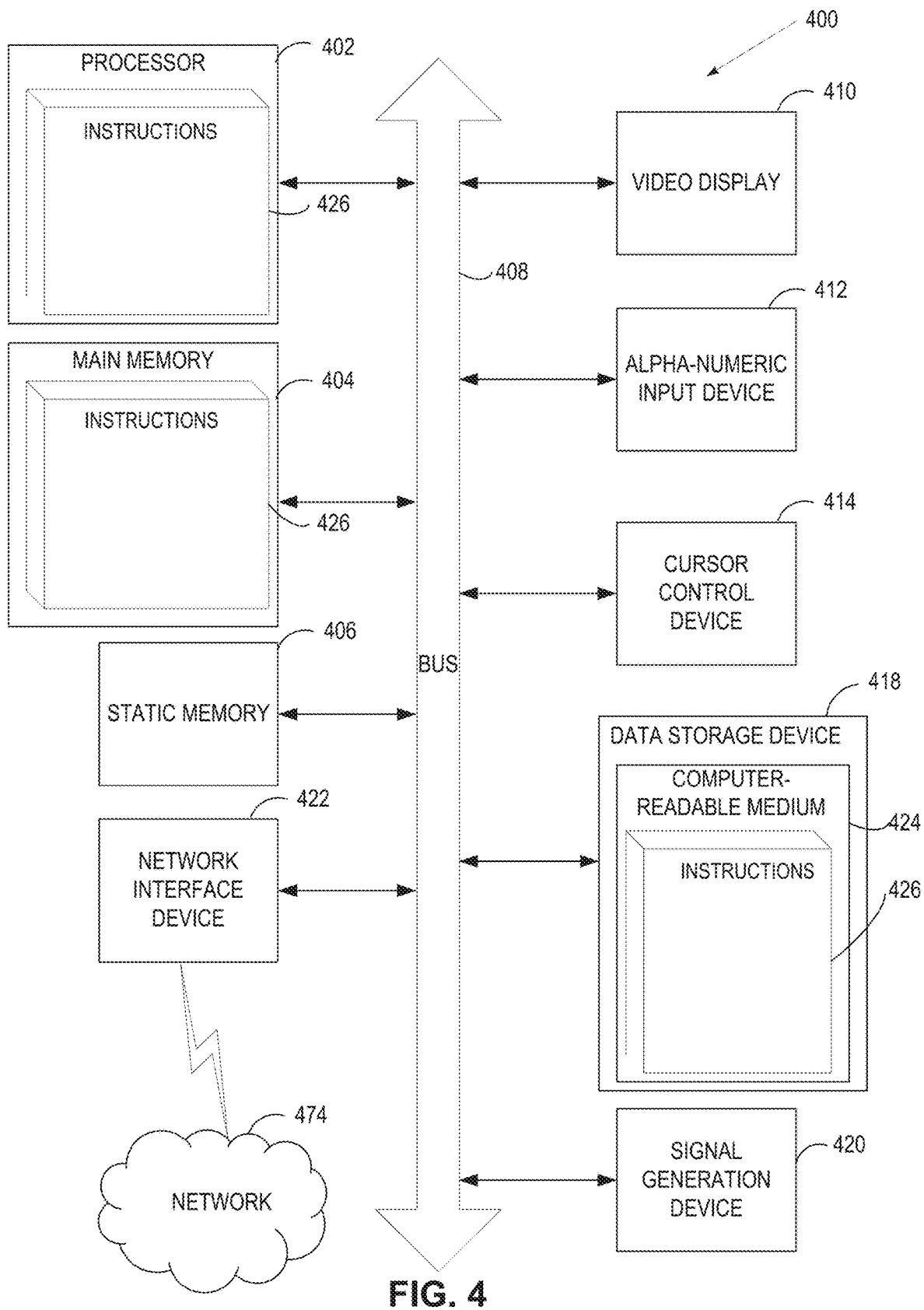
FIG. 4 is a block diagram illustrating a computer system, according to certain embodiments.

FIG. 4 is a block diagram illustrating a computer system 400, according to certain embodiments. In some embodiments, the computer system 400 is one or more of controller of solar board system, controller of equipment, client device 136, predictive system 130, server machine 170, server machine 180, predictive server 132, etc.

In some embodiments, computer system 400 is connected (e.g., via a network, such as a Local Area Network (LAN), an intranet, an extranet, or the Internet) to other computer systems. In some embodiments, computer system 400 operates in the capacity of a server or a client computer in a client-server environment, or as a peer computer in a peer-to-peer or distributed network environment. In some embodiments, computer system 400 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein (e.g., one or more of methods 300A-C of FIGS. 3A-C, etc.).

In a further aspect, the computer system 400 includes a processing device 402, a volatile memory 404 (e.g., Random Access Memory (RAM)), a non-volatile memory 406 (e.g., Read-Only Memory (ROM) or Electrically-Erasable Programmable ROM (EEPROM)), and a data storage device 416, which communicate with each other via a bus 408.

In some embodiments, processing device 402 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 400 further includes a network interface device 422 (e.g., coupled to network 474). In some embodiments, computer system 400 also includes a video display unit 410 (e.g., an LCD), an alphanumeric input device 412 (e.g., a keyboard), a cursor control device 414 (e.g., a mouse), and a signal generation device 420.

In some implementations, data storage device 416 includes a non-transitory computer-readable storage medium 424 on which store instructions 426 encoding any one or more of the methods or functions described herein, including instructions for implementing methods described herein.

In some embodiments, instructions 426 also reside, completely or partially, within volatile memory 404 and/or within processing device 402 during execution thereof by computer system 400, hence, in some embodiments, volatile memory 404 and processing device 402 also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICS, FPGAs, DSPs or similar devices. In some embodiments, the methods, components, and features are implemented by firmware modules or functional circuitry within hardware devices. In some embodiments, the methods, components, and features are implemented in any combination of hardware devices and computer program components, or in computer programs.

Unless specifically stated otherwise, terms such as "actuating," "receiving," "training," "providing," "obtaining," "determining," "identifying," "causing," "generating," "transmitting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In some embodiments, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein, or includes a general purpose computer system selectively programmed by a computer program stored in the computer system. Such a computer program is stored in a computer-readable tangible storage medium.

Some of the methods and illustrative examples described herein are not inherently related to any particular computer or other apparatus. In some embodiments, various general purpose systems are used in accordance with the teachings described herein. In some embodiments, a more specialized apparatus is constructed to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

The terms "over," "under," "between," "disposed on," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

Reference throughout this specification to "one embodiment," "an embodiment," or "some embodiments" means that a particular feature, structure, or characteristic described in connection with the embodiment is included in at least one embodiment. Thus, the appearances of the phrase "in one embodiment," "in an embodiment," or "in some embodiments" in various places throughout this specification are not necessarily all referring to the same embodiment. In addition, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Also, the terms "first," "second," "third," "fourth," etc. as used herein are meant as labels to distinguish among different elements and can not necessarily have an ordinal meaning according to their numerical designation. When the term "about," "substantially," or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving historical sensor data and historical performance data;
   training a machine learning model with data input comprising the historical sensor data and target output comprising the historical performance data to generate a trained machine learning model, the trained machine learning model being capable of generating one or more outputs indicative of one or more of a first input or a second input;
   responsive to the first input, actuating a first plurality of valves of a solar board to be in an open position to provide cold water via a first manifold mounted to the solar board to first equipment and to receive hot water from the first equipment for efficient use of energy; and
   responsive to the second input, actuating a second plurality of valves of the solar board to be in the open position to provide the cold water via the first manifold and a second manifold mounted to the solar board to second equipment and to receive the hot water from the second equipment for the efficient use of the energy, wherein:
   the first equipment comprises a natural gas water heater and the second equipment comprises an electric water heater; or
   the first equipment comprises the electric water heater and the second equipment comprises the natural gas water heater.

2. The method of claim 1 further comprising:
   providing current sensor data to the trained machine learning model;
   obtaining, from the trained machine learning model, the one or more outputs indicative of predictive data; and
   determining, based on the predictive data, the one or more of the first input or the second input.

3. The method of claim 1, wherein the first manifold is configured to receive the cold water from a cold water inlet.

4. The method of claim 1, wherein the second manifold is configured to:
   receive the hot water from the first equipment responsive to a first valve and a second valve being in the open position, the first valve being disposed between the first manifold and a first equipment inlet, and the second valve being disposed between a first equipment outlet and the second manifold; and
   provide the cold water to the second equipment responsive to a third valve and a fourth valve being in the open position, the third valve being disposed between the first manifold and the second manifold, and the fourth valve being disposed between the second manifold and second equipment inlet.

5. The method of claim 4, wherein a third manifold is configured to:
   receive the hot water from the second manifold responsive to the first valve, the second valve, and a fifth valve being in the open position, the fifth valve being disposed between the second manifold and the third manifold; and receive the hot water from second equipment outlet responsive to the third valve, the fourth valve, and a sixth valve being in the open position, the sixth valve being disposed between the second equipment outlet and the third manifold.

6. The method of claim 1 further comprising responsive to third input, actuating the first plurality of valves and the second plurality of valves to provide the cold water via the first manifold to the first equipment, to receive partially heated water from the first equipment via the second manifold, to provide the partially heated water from the second manifold to the second equipment, and to receive the hot water from the second equipment.

7. A solar board system comprising:
a processing device configured to:
receive historical sensor data and historical performance data; and
train a machine learning model with data input comprising the historical sensor data and target output comprising the historical performance data to generate a trained machine learning model, the trained machine learning model being capable of generating one or more outputs indicative of one or more of a first input or a second input;
a board;
cold water inlet configured to receive cold water;
hot water outlet configured to provide hot water; and
a plurality of manifolds mounted to the board, the plurality of manifolds comprising:
a first manifold configured to receive the cold water from the cold water inlet; and
a second manifold configured to:
receive the hot water from first equipment responsive to a first valve and a second valve being in an open position responsive to the first input for efficient use of energy, the first valve being disposed between the first manifold and a first equipment inlet, and the second valve being disposed between a first equipment outlet and the second manifold; and
provide the cold water to second equipment responsive to a third valve and a fourth valve being in the open position responsive to the second input for the efficient use of the energy, the third valve being disposed between the first manifold and the second manifold, and the fourth valve being disposed between the second manifold and second equipment inlet, wherein:
the first equipment comprises a natural gas water heater and the second equipment comprises an electric water heater; or
the first equipment comprises the electric water heater and the second equipment comprises the natural gas water heater.

8. The solar board system of claim 7, wherein the plurality of manifolds further comprise a third manifold configured to:
receive the hot water from the second manifold responsive to the first valve, the second valve, and a fifth valve being in the open position, the fifth valve being disposed between the second manifold and the third manifold; and
receive the hot water from second equipment outlet responsive to the third valve, the fourth valve, and a sixth valve being in the open position, the sixth valve being disposed between the second equipment outlet and the third manifold.

9. The solar board system of claim 7 further comprising a controller, wherein responsive to first input, the controller is configured to actuate a first plurality of valves of the solar board system to be in the open position to provide the cold water via the first manifold to the first equipment and to receive the hot water from the first equipment.

10. The solar board system of claim 9, wherein responsive to second input, the controller is configured to actuate a second plurality of valves of the solar board system to be in the open position to provide the cold water via the first manifold and the second manifold.

11. The solar board system of claim 10, wherein the controller is configured to:
provide current sensor data to the trained machine learning model;
obtain, from the trained machine learning model, the one or more outputs indicative of predictive data; and
determine, based on the predictive data, the one or more of the first input or the second input.

12. The solar board system of claim 10, wherein responsive to third input, the controller is configured to actuate the first plurality of valves and the second plurality of valves to provide the cold water via the first manifold to the first equipment, to receive partially heated water from the first equipment via the second manifold, to provide the partially heated water from the second manifold to the second equipment, and to receive the hot water from the second equipment.

13. A non-transitory machine-readable storage medium storing instructions that when executed by a processing device, cause the processing device to perform operations comprising:
receiving historical sensor data and historical performance data;
training a machine learning model with data input comprising the historical sensor data and target output comprising the historical performance data to generate a trained machine learning model, the trained machine learning model being capable of generating one or more outputs indicative of one or more of a first input or a second input;
responsive to the first input, actuating a first plurality of valves of a solar board to be in an open position to provide cold water via a first manifold mounted to the solar board to first equipment and to receive hot water from the first equipment for efficient use of energy; and
responsive to the second input, actuating a second plurality of valves of the solar board to be in the open position to provide the cold water via the first manifold and a second manifold mounted to the solar board to second equipment and to receive the hot water from the second equipment for the efficient use of the energy, wherein:
the first equipment comprises a natural gas water heater and the second equipment comprises an electric water heater; or
the first equipment comprises the electric water heater and the second equipment comprises the natural gas water heater.

14. The non-transitory machine-readable storage medium of claim 13, wherein the operations further comprise:
providing current sensor data to the trained machine learning model;
obtaining, from the trained machine learning model, the one or more outputs indicative of predictive data; and
determining, based on the predictive data, the one or more of the first input or the second input.

15. The non-transitory machine-readable storage medium of claim 13, wherein the second manifold is configured to:
- receive the hot water from the first equipment responsive to a first valve and a second valve being in the open position, the first valve being disposed between the first manifold and a first equipment inlet, and the second valve being disposed between a first equipment outlet and the second manifold; and
- provide the cold water to the second equipment responsive to a third valve and a fourth valve being in the open position, the third valve being disposed between the first manifold and the second manifold, and the fourth valve being disposed between the second manifold and second equipment inlet.

16. The non-transitory machine-readable storage medium of claim 15, wherein a third manifold is configured to:
- receive the hot water from the second manifold responsive to the first valve, the second valve, and a fifth valve being in the open position, the fifth valve being disposed between the second manifold and the third manifold; and
- receive the hot water from second equipment outlet responsive to the third valve, the fourth valve, and a sixth valve being in the open position, the sixth valve being disposed between the second equipment outlet and the third manifold.

17. The non-transitory machine-readable storage medium of claim 13, wherein the operations further comprise, responsive to third input, actuating the first plurality of valves and the second plurality of valves to provide the cold water via the first manifold to the first equipment, to receive partially heated water from the first equipment via the second manifold, to provide the partially heated water from the second manifold to the second equipment, and to receive the hot water from the second equipment.

18. The solar board system of claim 7, wherein:
- the board comprises a rigid material;
- an outer surface of the board is planar;
- the cold water inlet is coupled to the board; the cold water is to be heated via the solar board system to generate hot water;
- the hot water outlet is coupled to the board;
- the hot water is to be used via a plumbing system;
- the solar board system further comprises a plurality of valves coupled to the board, wherein the plurality of valves are configured to be controlled to generate the hot water for the efficient use of the energy, the plurality of valves comprising the first valve, the second valve, the third valve, and the fourth valve; and
- the plurality of manifolds are coupled via one or more connectors to the board;
- the first manifold is configured to provide the cold water to first water heater equipment responsive to the first valve being at least partially open, and provide the cold water to the second manifold responsive to the third valve being at least partially open; and
- the second manifold is configured to receive the cold water from the first manifold responsive to the third valve being at least partially open, provide the hot water to the second water heater equipment responsive to the first valve, the second valve, and the fourth valve being at least partially open, and provide the hot water to the plumbing system via the hot water outlet responsive to the first valve and the second valve being at least partially open.

* * * * *